United States Patent
Guo et al.

(10) Patent No.: US 12,417,325 B2
(45) Date of Patent: Sep. 16, 2025

(54) SENSITIVITY ANALYSIS-BASED DEPENDABILITY TRADE-OFF ANALYSIS

(71) Applicant: SIEMENS INDUSTRY SOFTWARE NV, Leuven (BE)

(72) Inventors: Zhensheng Guo, Forstern (DE);
Christof Kaukewitsch, Munich (DE);
Marc Zeller, Munich (DE)

(73) Assignee: SIEMANS INDUSTRY SOFTWARE NV, Leuven (BE)

( * ) Notice: Subject to any disclaimer, the term of this patent is extended or adjusted under 35 U.S.C. 154(b) by 1011 days.

(21) Appl. No.: 17/493,878

(22) Filed: Oct. 5, 2021

(65) Prior Publication Data

US 2022/0114306 A1 Apr. 14, 2022

(30) Foreign Application Priority Data

Oct. 12, 2020 (EP) .................................... 20201365

(51) Int. Cl.
*G06F 30/20* (2020.01)
*G06F 11/07* (2006.01)

(52) U.S. Cl.
CPC .......... *G06F 30/20* (2020.01); *G06F 11/0721* (2013.01); *G06F 11/079* (2013.01)

(58) Field of Classification Search
CPC ..... G06F 11/0721; G06F 11/079; G06F 30/20
USPC .......................................................... 703/21
See application file for complete search history.

(56) References Cited

U.S. PATENT DOCUMENTS

| | | | |
|---|---|---|---|
| 10,572,331 B2 * | 2/2020 | Höfig | G06F 11/008 |
| 2002/0107821 A1 | 8/2002 | Karas | |
| 2009/0222239 A1 | 9/2009 | Ehlers | |
| 2019/0011905 A1 * | 1/2019 | Knauder | G05B 23/0216 |

(Continued)

FOREIGN PATENT DOCUMENTS

| | | |
|---|---|---|
| CN | 110245373 A | 9/2019 |
| WO | WO 2020126306 A1 | 6/2020 |

OTHER PUBLICATIONS

Elahi Golnaz, Eric Yu: Modeling and analysis of security trade-offs—a goal oriented approach., retrievable at ftp://www.cs.toronto.edu/dist/eric/ER07-Elahi.pdf; 2009.

(Continued)

*Primary Examiner* — Andre Pierre Louis
(74) *Attorney, Agent, or Firm* — Schmeiser, Olsen & Watts LLP

(57) ABSTRACT

Sensitivity analysis of failure events associated with components of a technical system is provided. It is possible to determine, for a plurality of components of a technical system configured in accordance with at least one initial design, importance values which are indicative of a dependency of at least one non-functional specification of a plurality of non-functional specifications of the technical system configured in accordance with the at least one initial design on a change of the technical system with respect to the components of the plurality of components. The method further includes determining a further design of the technical system based on the at least one initial design, the importance values, and a predefined function describing a joint quality score of the plurality of non-functional specifications for the technical system being configured in accordance with a respective design of the technical system.

14 Claims, 5 Drawing Sheets

(56) References Cited

U.S. PATENT DOCUMENTS

2019/0278647 A1    9/2019   Bakucz
2022/0035927 A1*   2/2022   Lysecky ................ G06F 21/566

OTHER PUBLICATIONS

Sutcliffe, Alistair et al:"Applying Evolutionary Computing to Complex Systems Design"; IEEE Transactions on Systems, Man Andcybernetics. Part A:Systems and Humans; IEEE Service Center; Piscataway; NJ; US; vol. 37, No. 5; Sep. 1, 2007; pp. 770-779; XP011190738; ISSN: 1083-4427; DOI: 10.1109/TSMCA.2007. 902653.

Grunske, Lars: "Identifying "Good" Architectural Design Alternatives with Multi-Objective Optimization Strategies"; 28th International Conference on Software Engineering Proceeding; ACM; 2 Penn Plaza; Suite 701 New York NY 10121-0701; USA: May 28, 2006; pp. 849-852; XP058347103; DOI: 10.1145/1134285. 1134431; ISBN: 978-1-59593-375-1.

Van Der Borst, Mario, and H. Schoonakker. "An overview of PSA importance measures." Reliability Engineering & System Safety 72.3 (2001): 241-245.; 2001.

Meng, Fan C. "Relationships of Fussell-Vesely and Birnbaum importance to structural importance in coherent systems." Reliability Engineering & System Safety 67.1 (2000): 55-60.

Yansong, Ren et al: "Design of reliable systems using static and dynamic fault trees"; IEEE Transactions on Reliability.; vol. 47; No. 3; Jan. 1, 1998; pp. 234-244; XP055780622; ISSN: 0018-9529; DOI: 10.1109/24.740491.

Idaho National Laboratory, "Module N Importance Measures", https://www.nrc.gov/docs/ML1216/ML12160A479.pdf, retrieved Oct. 8, 2020; p. N-8; 2020.

Iyer, Srinivas. "The Barlow-Proschan importance and its generalizations with dependent components." Stochastic processes and their applications 42.2 (1992): 353-359.; 1992.

Wu, Shaomin, and Frank PA Coolen. "A cost-based importance measure for system components: An extension of the Birnbaum importance." European Journal of Operational Research 225.1 (2013): 189-195.; 2013.

Extended European Search Report dated Mar. 16, 2021 for Application No. 20201365.2.

* cited by examiner

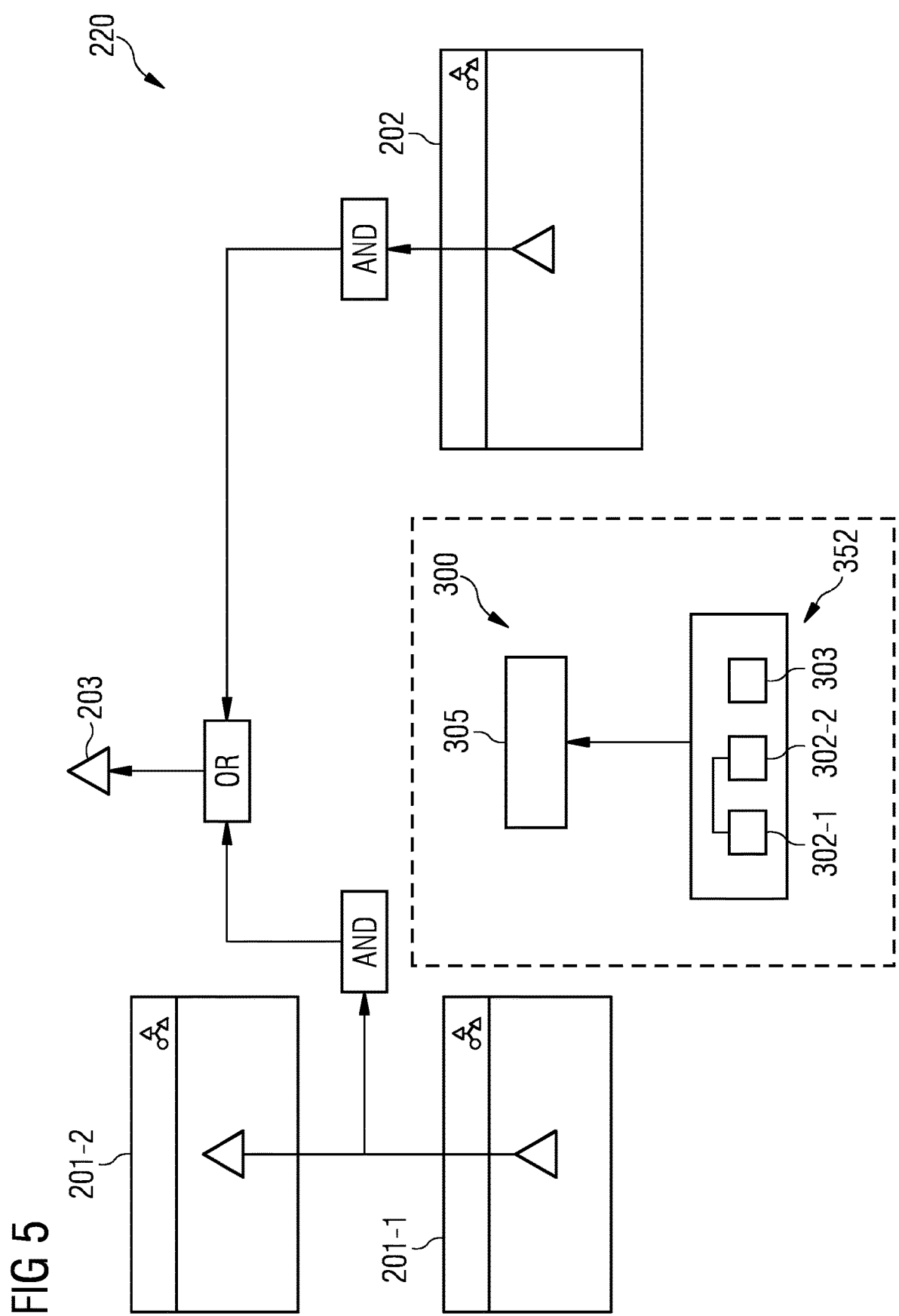

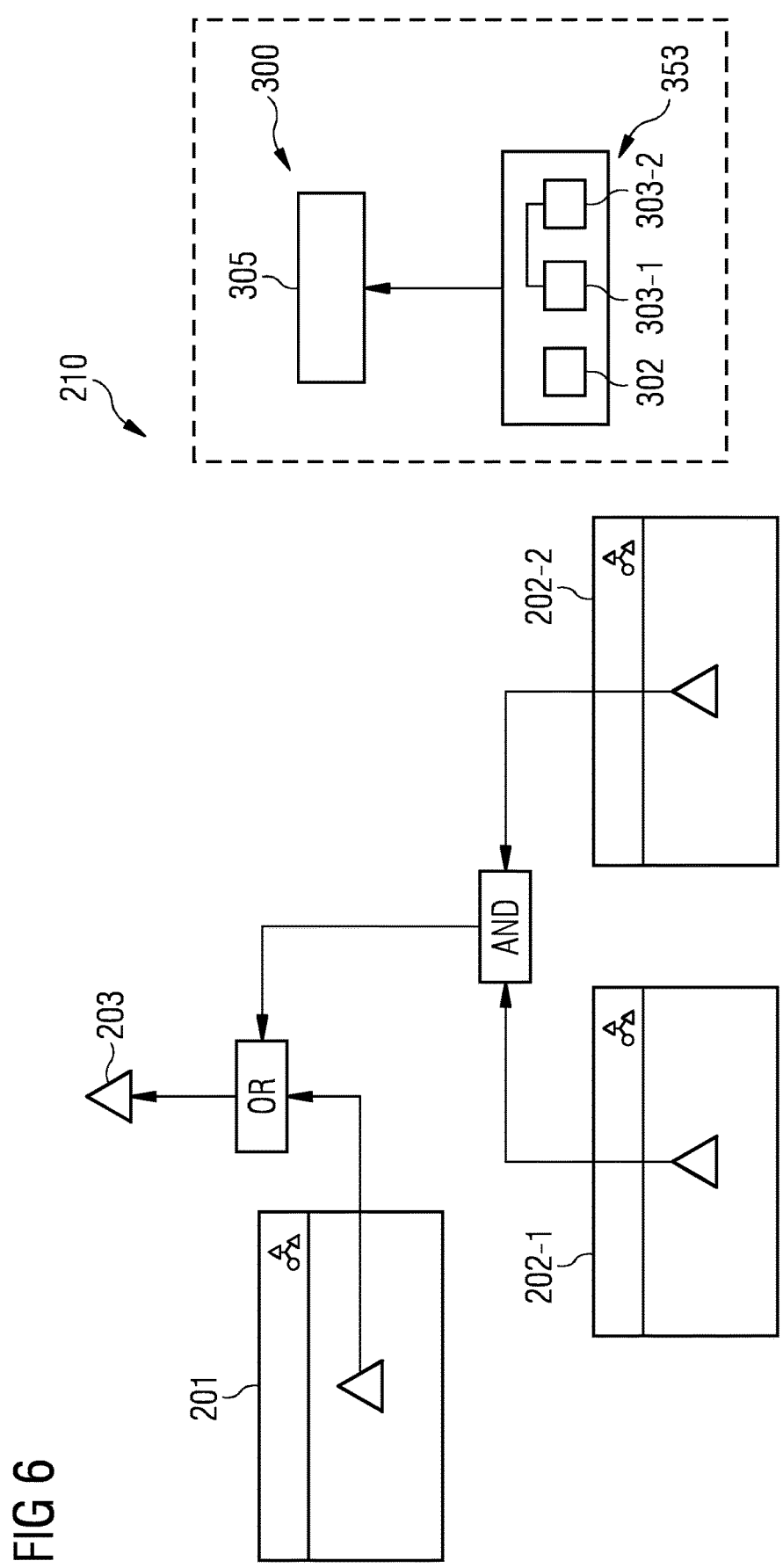

SENSITIVITY ANALYSIS-BASED DEPENDABILITY TRADE-OFF ANALYSIS

CROSS-REFERENCE TO RELATED APPLICATIONS

This application claims priority to European Application No. 20201365.2, having a filing date of Oct. 12, 2020, the entire contents of which are hereby incorporated by reference.

FIELD OF TECHNOLOGY

Various examples of the disclosure generally relate to evaluating or determining one or more designs of a technical system. Various examples of the disclosure specifically relate to employing a trade-off analysis and/or a sensitivity analysis when evaluating or determining the one or more designs.

BACKGROUND

There are typically multiple designs for implementing a technical system providing a certain functionality. A design can generally denote a configuration of the technical system, e.g., presence or absence of various components of the technical system and/or configuration of the components of the technical system.

SUMMARY

An aspect relates to facilitating determination of an appropriate design of a technical system.

A computer-implemented method includes determining importance values for a plurality of components of a technical system which is configured in accordance with a least one initial design. The importance values are indicative of a dependency of at least one non-functional specification on a change of the technical system with respect to the components of the plurality of components. The at least one non-functional specification as part of a plurality of non-functional specifications of the technical system that is configured in accordance with the at least one initial design. The method also includes determining a further design of the technical system based on the at least one initial design, the importance values, as well as a predefined function. The predefined function describes a joint quality score of the plurality of non-functional specifications for the technical system being configured in accordance with a respective design of the technical system.

The change of the technical system with respect to a given component of the plurality of components may include: duplicating the given component; changing the given component, e.g., upgrading the given component; adding a further component monitoring the given component; etc.

The importance value, in other words, describes the impact of the change onto the at least one non-functional specification. Different components of the plurality of components can be associated with different importance values. The importance values can be component-specific, i.e., each importance value can describe an impact of the change of the technical system with respect to the respectively associated component on the joint quality score.

The joint quality score can be based on a plurality of partial quality scores associated with the plurality of non-functional specifications.

A computer program or a computer-program product or a computer-readable storage medium includes program code. The program code can be loaded and executed by least one processor. Upon loading and executing the program code the at least one processor performs a method. The method includes determining importance values for a plurality of components of a technical system which is configured in accordance with a least one initial design. The importance values are indicative of a dependency of at least one non-functional specification on a change of the technical system with respect to the components of the plurality of components. The at least one non-functional specification as part of a plurality of non-functional specifications of the technical system that is configured in accordance with the at least one initial design. The method also includes determining a further design of the technical system based on the at least one initial design, the importance values, as well as a predefined function. The predefined function describes a joint quality score of the plurality of non-functional specifications for the technical system being configured in accordance with a respective design of the technical system.

A device comprising a control circuitry. The control circuitry is configured to determine, for a plurality of components of a technical system configured in accordance with at least one initial design, importance values, the importance values being indicative of a dependency of at least one non-functional specification of a plurality of non-functional specifications of the technical system configured in accordance with the at least one initial design on a change of the technical system with respect to the components of the plurality of components. The control circuitry is further configured to determine a further design of the technical system based on the at least one initial design, the importance values, and a predefined function describing a joint quality score of the plurality of non-functional specifications for the technical system being configured in accordance with a respective design of the technical system.

According to various examples, a sensitivity analysis and a trade-off analysis are combined to determine at least one design of the technical system. Based on the sensitivity analysis, one or more components of the technical system are identified; then, the technical system can be changed with respect to these one or more components. Based on the trade-off analysis, it is then possible to judge whether the change technical system fulfils a joint quality score.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with references to the following Figures, wherein like designations denote like members, wherein:

FIG. 1 schematically illustrates a device including a control circuitry according to various examples;

FIG. 2 is a flowchart of a method according to various examples;

FIG. 3 schematically illustrates a workflow including a combined sensitivity analysis and trade-off analysis according to various examples;

FIG. 5 illustrates the technical system of FIG. 4 and an associated fault tree according to a further design according to various examples; and FIG. 6 illustrates the technical system of FIG. 4 and an associated fault tree according to yet a further design according to various examples.

DETAILED DESCRIPTION

Figure 1:
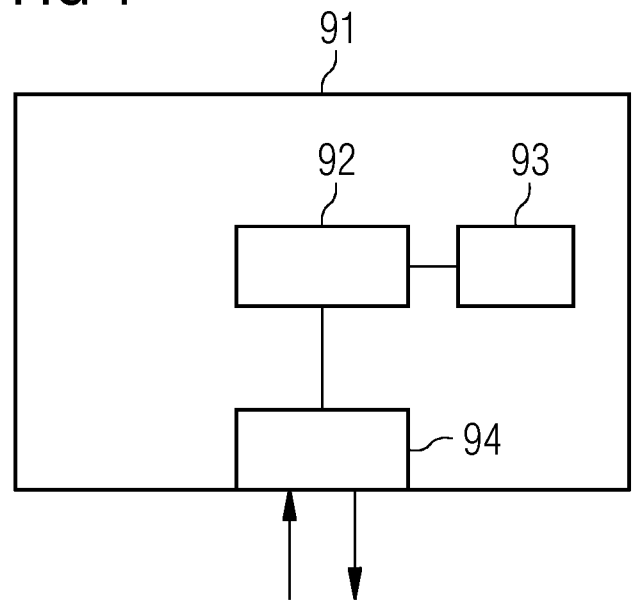

Some examples of the present disclosure provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein enable determining a design of a technical system. As a general rule, determining a design can correspond to finding a respective configuration of the technical system. Determining a design can also pertain to evaluating a pre-defined configuration associated with the design and finding that it is appropriate and/or fulfills certain requirements.

As a general rule, the techniques described herein can be applicable to various kinds and types of technical systems across different fields of industry. For instance, it would be possible to determine a design of a vehicle, e.g., a train, a locomotive, an airplane, a passenger vehicle, etc. It would be possible to determine a design of an electrical power plant or at least a part thereof. For instance, it would be possible to determine a design of a generator or a turbine, e.g., a gas turbine. For instance, it would be possible to determine a design of a wind power plant or underwater pressure container. It would be possible to determine a design of a robot, e.g., for a manufacturing facility.

For instance, a given design may be characterized by a set of components and their respective configurations. For different designs, different components may be replaced by other components or extra components may be added. Duplicate components may be included to increase the reliability. A design can denote the type and count of components and their interaction.

As will be appreciated, the number of candidate designs of a technical system can be large, in particular, for complex systems including a large number of components. Accordingly, various techniques are based on the finding that it is required to efficiently find a certain design of the technical system that fulfills one or more requirements. Using the techniques described herein, it is possible to efficiently determine a design of the technical system having optimized properties.

According to various examples, it is possible to determine a joint quality score for a given design of the technical system. The joint quality score can describe how well a plurality of non-functional specifications of the technical system being configured in accordance with the given design are being met. Sometimes, such non-functional specifications are also referred to as dependability properties. The non-functional specifications provide an indication of how well functionality-agnostic properties are fulfilled. Accordingly, the joint quality score may be referred to as Dependability Trade-off Analysis Value (DTAV) or simply dependability priority number (DPN).

According to the techniques described herein, it is possible to determine a design of the technical system which has a particularly high joint quality score, i.e., fulfils requirements imposed with respect of the plurality of non-functional specifications particularly well.

Example non-functional specifications are provided below in TAB. 1.

TABLE 1

Various non-functional specifications of a technical system according to various examples. A joint quality score can include contributions from two or more of such and other non-functional specifications. It is possible that non-functional specifications listed above as separate items correlate with each other. For instance, an increased reliability may also result in an increased availability. They can also be negatively correlated non-functional specifications: e.g., increased reliability may be associated with a decreased maintainability.

| | Example | Example description |
|---|---|---|
| I | Safety | Safety can pertain to a risk to persons or equipment or environment stemming from operation of the technical system given a given design. For example, some designs of the technical system may be safer to operate, i.e., with a reduced risk exposure to the environment. |

TABLE 1-continued

Various non-functional specifications of a technical system according to various examples. A joint quality score can include contributions from two or more of such and other non-functional specifications. It is possible that non-functional specifications listed above as separate items correlate with each other. For instance, an increased reliability may also result in an increased availability. They can also be negatively correlated non-functional specifications: e.g., increased reliability may be associated with a decreased maintainability.

| Example | | Example description |
|---|---|---|
| II | Reliability | Reliability can pertain to a likelihood of failure of the technical system, i.e., break down. For instance, reliability may correlate with a Mean-Time-Between-Failures (MTBF). |
| III | Availability | Availability can pertain to a likelihood of the technical system using a given design becoming unavailable for operation. Also, availability can correlate with MTBF. For instance, a technical system may become unavailable for operation, e.g., due to failure or a need for maintenance. |
| IV | Maintainability | Maintainability can pertain to an ease of a technical system having a given design being maintained. For instance, a high maintainability can be provided if replacement components are easily available and/or if a replacement of components can be easily accomplished, e.g., because the respective components are readily accessible. |
| V | Security, e.g., IT security | Security can pertain to a risk of unauthorized access to the control of the technical system, e.g., hijacking or hacking. |
| VI | Costs | Costs can pertain to, e.g., non-re-occurring costs for manufacture and/or re-occurring costs during operation of the technical system. |
| VII | Resources | Resources can pertain to, e.g., fuel or energy required to operate the technical system. |

As a general rule, various techniques to determine non-functional specifications as listed above are known. For instance, costs could be determined using a base function that considers a bill-of-material. Resources could be determined using an empirically parametrized base function that describes the resources as a function of output units or operational uptime, etc. To address previously listed types of non-functional requirements, various methods can be used such as: Hazard and Risk Analysis, Functional Hazard Analysis FHA, Failure Mode and Effect Analysis FMEA, Failure Modes, Effects and Diagnostic Analysis FMEDA, Failure Modes, Effects and Criticality Analysis FMECA, Threat and Risk Analysis TARA, Fault Tree Analysis FTA, Component Fault Tree CFT Analysis, Markov models, Reliability Block Diagrams, Attack Trees and so on. It would be possible to model one or more non-functional specifications of the technical system—in particular reliability—using a Markov chain.

As a further general rule, each non-functional specification according to TAB. 1 can be described by a respective partial quality score. It is then possible to determine the joint quality score of the technical system based on a combination of the partial quality scores of the multiple non-functional specifications to be considered.

By considering a joint quality score, a trade-off analysis considering conflicting contributions to the joint quality score from two or more opposing non-functional specifications can be considered. For instance, scenarios are conceivable in which a certain change in the design of the technical system has a conflicting impact on the partial quality score of two different non-functional specifications. For instance, a change in the design of the technical system may increase the partial quality score for reliability, but may decrease partial quality score for maintainability.

The joint quality score can be determined based on a weighted combination of the partial quality scores. Such weighted combination can determine whether the improved partial quality score with respect to one non-functional specification outweighs the decrease partial quality score with respect to another non-functional specification. A weighting factor can be multiplied, e.g., 1000 (safety may be 1000 times more important than reliability). The respective weighting factors may be set based on an expert opinion and on an importance of the individual partial quality scores for the joint quality score.

An example of weighting factors:

"Safety": i=1, $K_1$=100;

"Reliability": i=2, $K_2$=10;

"Availability": i=3, $K_3$=1;

"Maintainability": i=4, $K_4$=0.1;

"Security": i=5, $K_5$=0.01.

As a general rule, the joint quality score can be determined based on a target function. The target function can include multiple contributions corresponding to the partial quality scores. These contributions can be weighted, to implement such a weighted combination as described above. Each individual contribution can include a respective base function. Optionally, one or more of these contributions can include an activation function. Non-linear impact of the respective result of the base function onto the joint quality score can be modelled. Based on such activation function, acceptance thresholds can be modelled. For instance, maintainability may be acceptable up to a certain degree and then immediately become unacceptable. This could be modelled by a step-shaped activation function. A Heaviside-function can be used.

Thus, the target function may be given by (for the example of the dimensions, r, m, s, e.g., reliability, maintainability, and safety, see TAB. 1):

$$tf = w_r * t_r * b_r + w_m * t_m * b_m + w_s * t_s * b_s$$

w denotes the weighting factor, t the activation function, and b the base function. For instance, the activation function t could be a Heaviside function or a step function. A non-linear increase could be modelled by the activation function.

This can be generalized to, $$tf = \sum_i w_i t_i b_i,$$ (1)

where i is the index across the plurality of non-functional specifications.

Various techniques facilitate to efficiently determine one or more designs of the technical system that fulfill one or more requirements regarding the joint quality score, e.g., defined by the target function of Eq. 1. In particular, a set of candidate designs can be efficiently tested regarding whether the candidate designs fulfill or does not fulfill the one or more requirements regarding the joint quality score. It would be possible to iteratively refine designs by incremental changes to the technical system, to thereby arrive at an optimized design.

For example, it would be possible to determine, for a given design, importance values which are indicative of a dependency of at least one non-functional specification—e.g., reliability—of a plurality of non-functional specifications of the technical system configured in accordance with a respective design on a change of the technical system with respect to the components. In other words, a given importance value determined for a certain component of the technical system can quantify an impact of a change of the technical system with respect to that component on at least one non-functional specification of the plurality of non-functional specifications considered in the target function for the joint quality score, e.g., according to equation (1). For example, a high importance value can indicate that a change of the technical system with respect to this component will have a significant impact on the joint quality score; whereas a low importance value can indicate that the change of the technical system with respect to this component will only have a limited impact on the joint quality score.

As a general rule, various changes of the technical system with respect to a given component are conceivable. Some of such options for changes of the technical system are summarized below in TAB. 2.

TABLE 2

Various options for implementing a change of the technical system with respect to a given component. By using such techniques, a further design of the technical system can be facilitated, based on an initial design. The further design can have improved non-functional specifications, e.g., meeting one or more non-functional requirements.

| | Option for a change of the respective technical component | Example details |
|---|---|---|
| I | Replacement by a different component of similar type | A given component can be replaced by a different component of similar type if the required functional and non-functional requirements are met. For instance, a pressure sensor of model X can be replaced by another pressure sensor of model Y. Typically, different components of similar type will have an impact on one or more non-functional specifications, e.g., reliability. Some components of a given type may be more reliable than other components of that type. |
| II | Duplication of component | A given component can be replaced by two or more similar components. This can increase redundancy. Thereby, typically, the reliability is increased by creating a redundant system. For instance, partial quality scores of costs and maintainability can decrease. |
| III | Removal of a component | A given component can be removed. Then, respective functionality may not be available in the technical system. This may, on the one hand, simplify the system; but, on the other hand, e.g., increase reliability (if not in the redundant path). |
| IV | Replacement by a different component of different type | For instance, a given component can be replaced by a different component of different type, but offering similar functionality. For instance, a microelectromechanical pressure sensor may be replaced by a pressure sensor using piezoelectric effect. Typically, different components of different type, by providing similar functionality, may exhibit strongly different non-functional specifications. If combined in a redundant configuration the probability of common failures of diverse components can often be considerably reduced compared to redundant configuration of identical components. |
| V | Using a monitoring system | For instance, for a given component, another component may be added that has the functionality of monitoring the operability of the given component. A monitoring circuitry may be provided. This can increase the safety of operation because (dormant) failures may be detected. |

As a general rule, the degree of the change can depend on the importance values, i.e., larger importance values can be associated with smaller changes. Thereby, where the impact of a certain component on the joint quality score is large and options for implementing a change are feasible, small changes can be used in order to efficiently adjust the design of the technical system.

As a further general rule, the degree of the change—i.e., more severe changes versus small changes—can depend on an overall fault rate, e.g., the partial quality score associated with reliability as a particular non-functional specification. For instance, where the reliability is particularly low, a more significant change can be warranted. The reliability partial quality score can be determined from a fault tree analysis.

As a general rule, various kinds and types of such importance values are conceivable. Importance values characterize the impact of a change of a given component of a technical system on at least one of the non-functional specifications of the technical system. Some measures to determine importance values are described in: Van der Borst, Mario, and H. Schoonakker. "An overview of PSA importance measures." *Reliability Engineering & System Safety* 72.3 (2001): 241-245. Some options for such importance values are summarized in TAB. 3.

TABLE 3

Various options for importance values. Based on the importance values, it is possible to detect how the one or more of the non-functional specifications correlate with failure modes of a respective component. Importance calculations can be conducted for different design alternatives. Importance values can be calculated for multiple components.

| | Importance Value | Explanation |
|---|---|---|
| I | Barlow-Proschan importance | Iyer, Srinivas. "The Barlow-Proschan importance and its generalizations with dependent components." *Stochastic processes and their applications* 42.2 (1992): 353-359. |
| II | Birnbaum importance | Wu, Shaomin, and Frank PA Coolen. "A cost-based importance measure for system components: An extension of the Birnbaum importance." *European Journal of Operational Research* 225.1 (2013): 189-195. |
| III | Fussell-Vesely importance | Meng, Fan C. "Relationships of Fussell-Vesely and Birnbaum importance to structural importance in coherent systems." *Reliability Engineering & System Safety* 67.1 (2000): 55-60. |
| IV | Risk reduction worth | Idaho National Laboratory, "MODULE N IMPORTANCE MEASURES", https://www.nrc.gov/docs/ML1216/ML12160A479.pdf, retrieved Oct. 8, 2020; page N-8 |
| V | Risk achievement worth | Idaho National Laboratory, "MODULE N IMPORTANCE MEASURES", https://www.nrc.gov/docs/ML1216/ML12160A479.pdf, retrieved Oct. 8, 2020; page N-810 |
| VI | Sequential importance | |
| VII | Sensitivity values | The sensitivity values can be determined for multiple failure events of the plurality of components of the technical system. As a general rule, failure events can specify that a respective component fails in operation. The component can then have no functionality or an impaired functionality. As a general rule, a failure event may describe an impaired functionality of a respective component with respect to a reference functionality. For instance, a failure event for a pressure sensor would be that the pressure sensor cannot provide any measurements of the ambient pressure or provides faulty measures of the ambient pressure. A failure event could also pertain to an increased power consumption of the pressure sensor or the pressure sensor operating at a reduced sampling rate.<br>Then, the sensitivity values can be indicative of a sensitivity of the at least one non-functional specification of the plurality of non-functional specifications of the technical system configured in accordance with the respective design on the multiple failure events. Accordingly, it is possible that a sensitivity analysis of the failure events specifies how much the respective non-functional specification depends on the failure events of the respective component in the sense of impacting, e.g., reliability or maintainability.<br>It would be possible that the sensitivity values are determined based on a partial derivative of the predefined function according to Eq (1) with respect to the multiple failure events.<br>The sensitivity value of a given failure event (or basic event) can be denoted with absolute values by:<br>$Dtf/Dx_i = Sa$ (2)<br>Or more generally with relative values:<br>$$\frac{\Delta tf}{tf} = S\frac{\Delta U_X}{U_X} \quad (3)$$<br>i.e., the sensitivity value for a given component can for instance be calculated by changing the unavailability of the associated |

TABLE 3-continued

Various options for importance values. Based on the importance values, it is possible to
detect how the one or more of the non-functional specifications correlate with failure modes of a
respective component. Importance calculations can be conducted for different design
alternatives. Importance values can be calculated for multiple components.

| Importance Value | Explanation |
| --- | --- |
| | failure event of a component by x%, capturing the changing of the overall target function of the system by y%, the ratio (S = y/x) between these two changes is the sensitivity. Here, it would be possible that the base functions are implemented by a result of a fault tree analysis Then, the partial derivative can cover such dependencies of the target function via the dependency of the base function on the failure events. |

Once one or more components have been identified that are associated with high importance values—i.e., components that impact the joint quality score significantly—, it is possible to determine a further design of the technical system based on a respective initial design (for which importance values have been calculated), the importance values, and the predefined function describing a joint quality score of the plurality of non-functional specifications of the technical system being configured in accordance with a respective design of the technical system. For instance, it would be possible to determine the further design by reconfiguring the technical system with respect to a respective component being identified based on the importance values (e.g., in accordance with the options according to TAB. 2). Then, the predefined function can be used to determine the joint quality score and, if the joint quality score then fulfills a predefined criteria, the further design can be used for subsequent rollout of production of the technical system.

By such techniques it is possible to use results of an analysis of importance values for effective dependability trade-off analysis. This helps finding out the most significant components of the technical system for optimizing the current technical system with respect to multiple non-functional specifications, to reach goals for the joint quality score. At the same time, the results of the dependability analysis (the joint quality score determined based on the target function) offer additional information in terms of how well the further design (i.e., a re-design) of the technical meets certain predefined criteria.

FIG. 1 schematically illustrates a device 91 according to various examples. The device 91 includes a processor 92 and a memory 93. The processor 92 and the memory 93 form a control circuitry. The device 91 also includes an interface 94 via which data can be provided to the processor 92 or output from the processor 92. The processor 92 is configured to load program code from the memory 93 and execute the program code. Upon loading and executing the program code, the processor 92 performs techniques as described herein, e.g.: determining a further design of a technical system based on a current design of the technical system; determining a joint quality score for a given design of a technical system, e.g., by calculating a target function that includes multiple base functions associated with a plurality of non-functional specifications, e.g., according to TAB. 1; determining, for at least some components of a plurality of components of the technical system, respective importance values, the importance values being indicative of a dependency of at least one non-functional specification of the plurality of non-functional specifications of the technical system configured in accordance with the respective design on a change of the technical system with respect to the respective component; performing a sensitivity analysis, e.g., by determining a partial derivative of a target function that describes a joint quality score with respect to a plurality of non-functional specifications; performing a trade-off analysis by determining the joint quality score using the target function; iteratively performing a sensitivity analysis and a trade-off analysis; etc.

Figure 2:
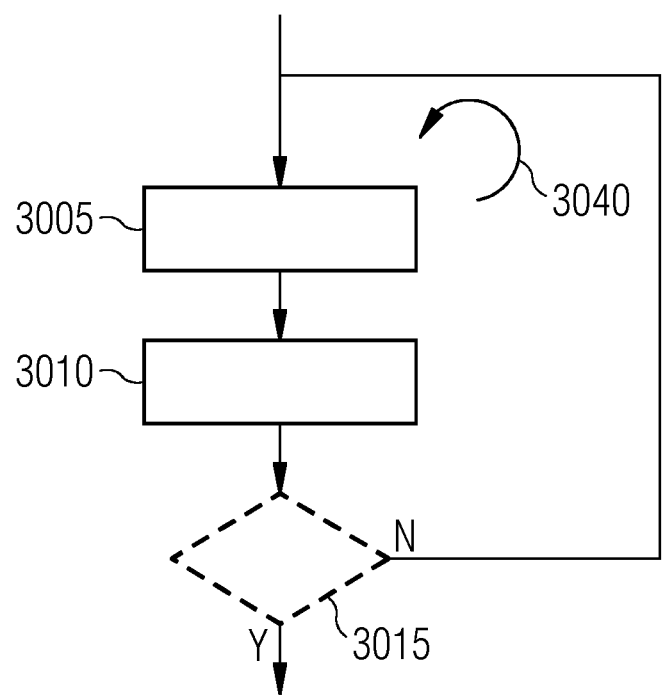

FIG. 2 is a flowchart of a method according to various examples. For example, the method of FIG. 2 could be executed by the control circuitry including the processor 92 and the memory 93 of the device 91 according to FIG. 1. Using the method of FIG. 2, it is possible to determine one or more designs of a technical system including a plurality of components which fulfill one or more predefined criteria. Optional blocks are labeled with dashed lines in FIG. 2.

At block 3005, importance values are determined (cf. TAB. 3). The importance values are determined for the technical system configured in accordance with an initial design. For example, a technical system may include a plurality of components. Then, for each one of at least some of the plurality of components, respective importance values may be determined, e.g., by calculation. In other words, each importance value may be component-specific (while the metric to determine the importance value can be fixed for all components).

In some examples, the importance values may be implemented by sensitivity values (cf. TAB. 3, example VII). Here, one or more of the base functions can include a fault tree. The fault tree models the failure propagation through the technical system. The fault tree includes nodes/logical gates associated with failure events of the components of the technical system.

It is possible that, e.g., one or more of the base functions of the target function—cf. Eq. (1)—are modeled by a fault tree.

As such, the sensitivity values can be indicative of a sensitivity of at least one of the non-functional specifications (of the technical system that is configured with the respective design) on the multiple failure events. For instance, the sensitivity values could reveal that a given component of the technical system has a particularly large impact or a comparably little impact on the reliability of the technical system. In the first case, this can be indicative for the change of the technical system with respect to that technical component yielding a particular increase in the reliability. For instance, it would be possible that the sensitivity values are determined based on partial derivatives of the predefined target function describing the joint quality score with respect to the multiple failure events, cf. Eq. 2 and 3.

Next, at block 3010, a further design of the technical system is determined. The further design differs from the initial design underlying block 3005. This operation can depend on the initial design of the technical system based on which the importance values have been determined at block 3005. Block 3010 can also depend on the importance values determined for at least some of the plurality of components of the technical system. In particular, one or more components to be modified can be selected based on the importance values. Block 3010 also depends on the target function that describes the joint quality score. This is because the further design of the technical system should yield an improvement of the joint quality score if compared to the previous design.

As a general rule, various options are conceivable for selecting one or more components (these are the components to be modified and/or replaced) of the plurality of components for which the importance values have been determined. For instance, it would be conceivable that a ranking of the importance values is determined and one or more components of the at least some of the plurality of components are selected based on the ranking. For instance, the N>1 largest entries of the ranking could be selected and it would then be possible to reconfigure the technical system to obtain the further design with respect to the selected components. Typically, the highest feasible ranking component would be identified and (if technically and commercially feasible) it would be chosen (these can be more than one component of the same type, according to the modeling approach). Then the technical system would be adapted with respect to these selected component(s). Then the sensitivity analysis would be repeated and the process is repeated until one is satisfied with the results (e.g., the change of the joint quality score should saturate, i.e., target function should start to indicate no further improvement at some point. Also, the solution might become too costly, e.g., if costs are not involved in the target function).

In a further option, it would be possible to determine, at each execution of block 3005, multiple candidate designs for the technical system. Then, at block 3010, the joint quality scores can be determined for the technical system being configured in accordance with each one of the plurality of candidate designs and it would then be possible to select the further design from the plurality of candidate designs based on a comparison of the joint quality scores. For example, the further design can be the particular candidate design that has the maximum joint quality score.

There can be certain rules for selecting one or more components to be changed. Some of these rules are illustrated below.

(i) Sensitivity ranking, failure events (and associated one or more components) with higher ranking will be taken; if there are multiple rankings for a single event, this is due to the fact that there will be multiple fault trees of alternatives, the highest ranking that mostly reach the target top event failure rate will be chosen as the ranking of this event. If this ranking cause the other top events cannot reach their target failure rates, and alternative measures such as redundant event/component of this event, the next event with the second most significance will be chosen as the "change event" for architecture and failure rate changing, in order to determining the fulfillment of the top event/target failure rate.

(ii) Fulfillment of the target failure rates and/or other non-functional specifications. The failure event which fulfill all the target events will be chosen for the analysis according to their costs.

(iii) Cost, the failure event (and associated one or more components) with lowest cost will be chosen as the event to improve the failure rate and/or other non-functional specifications of the technical system. Here, the cost includes of the time to achieve the target failure and other cost such as effort to fulfill the target failure rate. The event with most significant ranking but with unaffordable cost will not be chosen as the optimal failure event for the best solution. The event and hence the associated component with highest ranking and with acceptable cost will be chosen as the suitable event for changing the technical system—and, as a consequence the associated fault tree will change as well—to form the best solution of the alternatives. Ranking will be checked first, if two events have same ranking and both fulfill all the target failure rates of the top events, the cost to achieve target failure rate will be considered, the event with lower cost will be chosen as the optimal event of the best alternatives.

It is optionally possible to execute multiple iterations 3040 of block 3005 and block 3010. Here, the further design determined at a preceding iteration at box 3010 can serve as the initial design of a subsequent iteration 30404 block 3005.

In case multiple iterations 3040 of blocks 3005 and 3010 are used, it would be possible to check, at block 3015, whether one or more abort criteria are fulfilled. As a general rule, various abort criteria are conceivable and some of these abort criteria are summarized below in TAB. 4.

TABLE 5

Examples for aborting the execution of multiple iterations 3040. Various abort criteria are illustrated, and it is possible that such abort criteria are combined with each other to form cumulative abort criteria.

| | Abort criterion | Example explanation |
|---|---|---|
| I | Joint quality score exceeding a threshold | It would be possible that for each iteration 3040 it is checked whether the respectively determined further design is associated with a joint quality score of the plurality of non-functional specifications exceeding a certain threshold, i.e., excelling the requirements. Once the joint quality score fulfills certain requirements, it may not be required to determine yet further designs by executing further iterations 3040. |
| II | Number of iterations 3040 exceeding a threshold | For instance, once the number of iterations 3040 crosses a threshold, further iteration 3040 may not be executed. Then, the design of the technical system of a pre-executed iteration 3040 may be selected that exhibits the maximum joint quality score. |

TABLE 5-continued

Examples for aborting the execution of multiple iterations 3040. Various abort criteria are illustrated, and it is possible that such abort criteria are combined with each other to form cumulative abort criteria.

| | Abort criterion | Example explanation |
|---|---|---|
| III | Change of the joint quality score falling below a threshold | It would be possible to track, from iteration to iteration 3040, the change of the joint quality score. If the joint quality score stabilizes at a certain value, i.e., does not show a significant change from iteration to iteration 3040, then, further iteration 3040 may not contribute significantly to an optimized designer of the technical system. Accordingly, further iteration 3040 may be aborted. |
| IV | Requirements for partial quality scores | It would be possible that also the partial quality scores need to fulfil certain abort criteria. For example, could be specified that there may not be any partial quality score that falls below a certain threshold, irrespective of the outcome of the joint quality score. |

Figure 3:
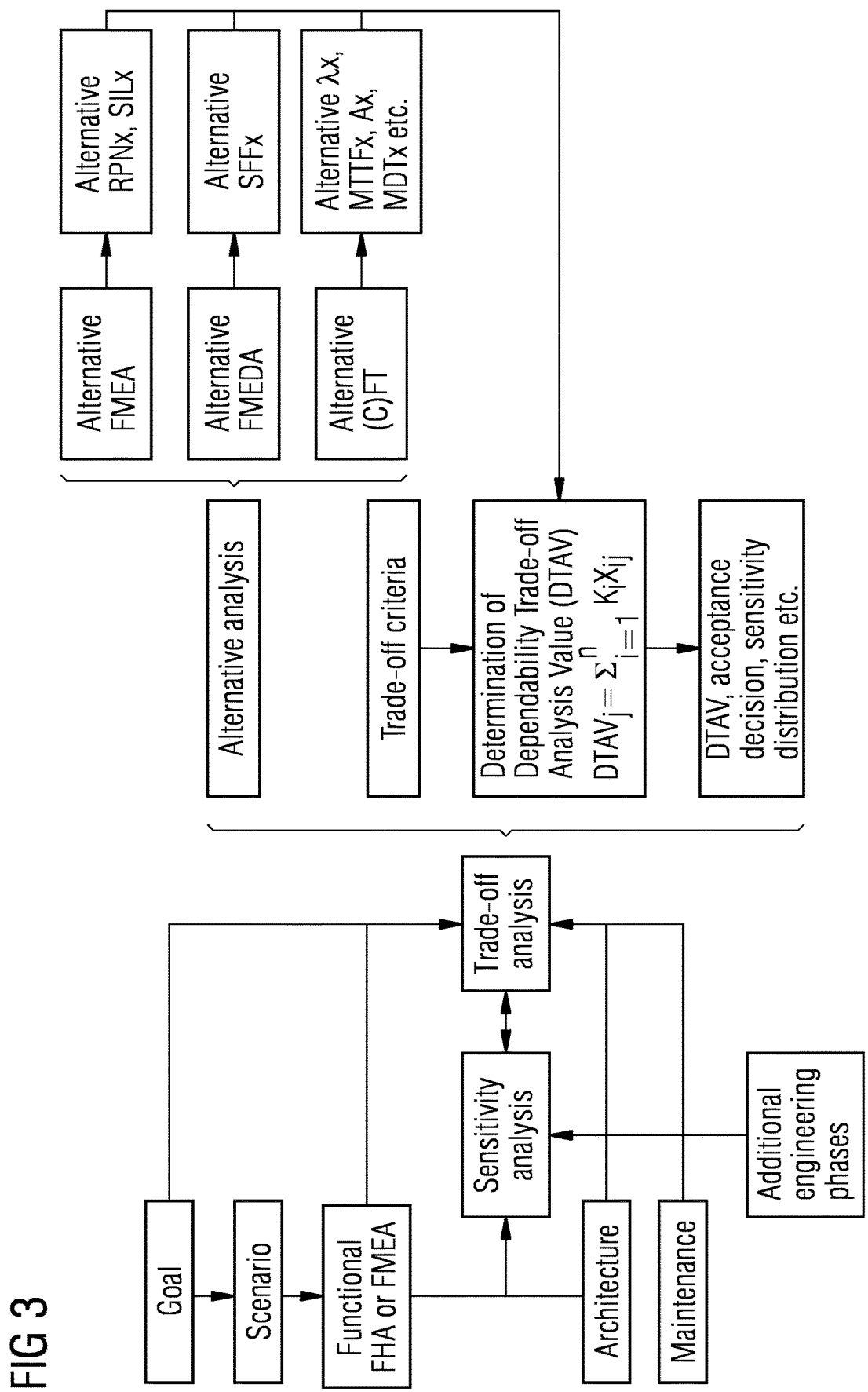

FIG. 3 shows a schematic dataflow for determining a joint quality score for one or more candidate designs of the technical system. The joint quality score is here referred to as dependability trade-off analysis value DTAV.

"Goal" in FIG. 3 indicates the optional elicitation of the goals of the stakeholders. Here the typical goal graph methods, such as goal structure notation, i* for Non-Functional Requirements etc. may be used. A goal corresponds to a dimension of the Eq. (1). A goal can specify, e.g., an abort criterion to be checked at block 3015. The goals may comprise target values for any or all of the dependability properties "i" and/or goals influenced or affected by the dependability properties "i". Abort criteria can thus be defined also with respect to the partial quality scores (cf. TAB. 5, example IV).

A coarse trade-off analysis among the identified goals could be performed already at this step, to identify the possible dependencies and conflicts. This trade-off analysis could be done by use of goal graph methods.

Based on the identified goals, the relevant scenarios with certain execution sequences will be determined ("Scenario" in FIG. 3). Such sequences including the sequence of stimulus, response in connection with ports, data, and environments, are e.g., described in Golnaz Elahi, Eric Yu: Modeling and analysis of security trade-offs—a goal-oriented approach.", retrievable at ftp://www.cs.toronto.edu/dist/eric/ER07-Elahi.pdf. The scenarios define the circumstance in which the candidate designs of the technical system are made. An example of such scenarios is "robot X shall be stopped when safety bumper is engaged". Scenarios define the aims and scope of the trade-off analysis.

Functional requirements may then be elicited based on the identified scenarios. For safety-critical systems, it is possible that the functional requirements, hazards (to be handled by the designated system) and their tolerable hazard rate (THR) are given by the domain authorities. The method may thus comprise receiving a signal indicating functional requirements, hazards and/or THRs.

The trade-off analysis may thus also be performed without explicitly defining the goals and scenarios additionally for any system or component that have been defined clearly be the domain authorities in the signal. If there are no such standardized requirements and their tolerable hazard rate THR, the functional requirements are to be elicited.

Based on the identified non-functional specifications (or: demands), properties of the candidate system configurations "j" will be determined. For example, a functional hazard analysis or function-based FMEA will be performed. The corresponding hazards, their Risk Priority Numbers RPN, their Safety Integrity Level SIL, and available measures can thus be identified. For fulfilling the previously set goals (e.g., Safety Integrity Level SIL) additional measures could be identified.

In the given example, where there is no further information about the system components and their failure rates, a qualitative FMEA or FHA may be performed for each of the candidate system configurations such that the improvements of the quality in Safety Integrity Level SIL or Risk Priority Number RPN of the alternative could be compared with the first measure. The rest steps of a qualitative trade-off analysis will be performed, wherein the possible conflicts to other dependability availability could be identified. In these steps the expert estimation is required.

The individual design of the technical system may correspond to different suggested or known measures for dealing with a given issue, as will be explained in more detail in the following.

Next, examples are described in connection with how to determine base functions and/or activation functions to determine partial quality scores for the non-functional specifications. Such space functions as leisure or activation functions can be used to determine the predefined target function, to thereby determine the joint quality score. For instance, for multiple non-functional specifications, the base functions and optionally an activation function may be used to determine the partial quality scores which then may be added in a weighted manner. The base functions of the target function (cf. Eq. 1) may be obtained with the help of the methods Functional Hazard Analysis, Risk Priority Number through Failure Mode and Effect Criticality Analysis FMECA qualitatively, or quantitatively by the Failure Mode and Effect Diagnostic Analysis FMEDA, Component Fault Tree Analysis CFTA, Fault Tree Analysis FTA, or other quantitative dependability techniques.

For example, when a Component Fault Tree CFT is used, quantitative details about the system to be considered are available. Different measures (reflected in, or realized by, different candidate system configurations) that affect the basic system design can be identified. Such measures are for example implementing additional redundancy, adding a monitoring mechanism, etc. They have clear and defined influences on the architecture of the system to be considered (or evaluated). The resulting designs resulting from the different measures (and optionally also a basic system to be modified by the measures) are than modeled by the Component Fault Tree CFT.

The calculated results of partial quality scores of the respective non-functional specifications—such as Mean Time to Failure MTTF, Mean Time Between Failures MTBF, Failure Rate 1 (lambda), Availability value A, Mean Down Time MDT etc.—are then used for comparing the respective designs.

For example, for the non-functional specification "Safety" (cf. TAB. 1, example I), calculated (and/or even qualitative) Risk Priority Number RPN, Safety Integrity Level SIL, Mean Time to Failure MTTF, Mean Time Between Failures MTBF, Failure Rate 1 (lambda) and/or the like may be used as a partial quality score. A corresponding expected value may be predefined by the authorities or by reference systems.

The joint quality score is then determined based on trade-off criteria, preferably at least based on the calculated and/or determined actual value and the expected value (e.g., whether a certain target is exceeded or not being met, e.g., as a fulfillment ratio). For example, the joint quality score may be based on a quotient, or a percentage, of the actual value with respect to the expected value, in particular directly proportional to the quotient or percentage.

However, additional trade-off criteria may be used to determine the joint quality score, such as limits (or: thresholds). Such limits or thresholds could be considered as part of the non-linear activation function, e.g., step functions, etc.

For the non-functional specification "Safety" (cf. TAB. 1, example I), i.e., in the safety domain, the acceptable lower limit may e.g., be set as the predefined expected value. A respective step function may be determined for the non-linear activation function. It is however also possible, a feasibility safety study of the system is the goal of the project, in this case the acceptable lower limit will be the expected acceptable lower limit.

In embodiments or variants where Failure Mode and Effect Diagnostic Analysis FMEDA is employed for determining a Safe Failure Fraction SFF (for estimation of the Safety Integrity Level), the Failure Mode and Effect Diagnostic Analysis FMEDA may be performed at least once for each candidate system configuration.

The calculated Safe Failure Fractions SFF and the Safety Integrity Levels SIL may then be used as respective actual value for comparison to an expected value in order to determine at least one of the dependability property fulfilment values—i.e., partial quality scores—$X_{ij}$.

In case a basic system configuration is set as a starting point—i.e., as initial design—and a number of possible modifications resulting in candidate further designs is considered, and when a measure neither leads to architecture changes nor to a structural change in the fault tree, the changed availability will be captured by e.g., the changed Mean Down Time.

For example, a warning contact may be provided to output a warning output signal indicating whether a brake of the train is worn out (has "worn out" status); for instance, the warning output signal may indicate a logical "HIGH" when the brake has the "worn out" status and a logical "LOW" when the brake does not have the "worn out" status.

Different further designs may, in this example, relate to which measures are to be taken when the output signal of the warning contact indicates the brake having the "worn out" status." One candidate further design may be the basic system configuration which is set up such that the measure is "stopping the train". Another candidate further design may be set up such that the measure is setting the train into a "low speed drive" mode.

The first measure of "stopping the train" heavily affects the non-functional specification "availability" negatively such that the partial quality score value $X_{\pm j}$ for the functional requirement "availability" is determined to be 0 (indicating "totally unacceptable"); moreover, the measure of "stop" provides no remarkable improvement on the functional requirement "Safety" compared to the measure "low speed mode".

On the other hand, the measure "low speed drive" is sufficient (regarding the functional requirement "Safety") to handle the warning output signal indicating the "worn out" status of the brake. The "low speed drive" can thus replace "stopping the train" as measure in case of the output signal being "HIGH".

This change could improve the functional requirement "availability" of the train as an example technical system. This change does not necessarily change the structure of the fault tree of the train, but down time will be reduced. The reduced down time will affect the calculation of the non-functional specification "availability" A positively because of A=MTBF/(MTBF+MDT), wherein MTBF is the Mean Time Between Failures which remains unchanged and MDT is the Mean Down Time which is reduced.

In this way, the availability comparison between the basic system configuration with the measure "stopping the train" and new solution "low speed drive" can be done even without changing the fault tree structure.

Further details with respect to such trade-off analysis are described in WO 2020/126306, the disclosure of which is incorporated herein by reference in its entirety.

As illustrated in FIG. 3, there is a combined sensitivity analysis and trade-off analysis. In particular, based on the sensitivity analysis, it is possible to determine importance values (in the illustrated example specifically sensitivity values, but—as a general—other importance values could be determined, cf. TAB. 3) being indicative of a dependency of at least one non-functional specification of the technical system configured in accordance with a respective initial design—e.g., obtained from the blocks scenario or architecture—on a change of the technical system with respect to the components for which the importance values are determined.

As a general rule, various variants are possible to implement the inter-relationship between the sensitivity analysis and the trade-off analysis. For example, while in the scenario FIG. 3 a bidirectional interaction is illustrated between the sensitivity analysis and the train-off analysis, in other examples, a unidirectional interaction would be possible. For instance, the sensitivity analysis may provide the sensitivity values to the trade-off analysis in a single iteration (cf. FIG. 2, iterations 3040).

The interaction between the sensitivity analysis and trade-off analysis occurs in the following variants:

TABLE 6

Various options for the interaction between the sensitivity analysis and the trade-off analysis.

| Variant | Input/Output | Explanation |
|---|---|---|
| I | Input: sensitivity of events of single fault tree<br>Output: best solution among alternatives | The sensitivity values help to find out the most significant failure event (and one or more associated components) so that the technical system can be changed with respect to the respective one or more associated components, cf. TAB. 2. Further, the joint quality score can be determined using the trade-off analysis for multiple further designs and the best design - e.g., having the highest joint quality score - can be selected - i.e., multiple different changes can be made to the technical system starting from a given initial design. Here the sensitivity analysis and result of trade-off analysis will transfer data in both directions, e.g., to implement the iterations 3040 according to FIG. 2. From the sensitivity analysis to the trade-off analysis, the significance values of the various error events will be transferred; from the trade-off analysis to the sensitivity analysis, it is possible to transfer whether result of trade-off analysis - i.e., the joint quality score - fulfilled the target goals (cf. TAB. 4) and to which extent the result of trade-off analysis fulfills the target goals. A respective design subject to the calculation of the joint quality score using the trade-off analysis can then be subject to the sensitivity analysis, as a further initial design. A mapping between the sensitivity and the results of trade-off analysis of alternatives will be established. Thereby, the most suitable significant events/components will be chosen as the object of the trade-off analysis. The data transfer will occur so many times (number of iterations 3040, cf. FIG. 2), until a sufficiently dependable design is obtained. |
| II | Input: result of trade-off analysis and/or best current design amongst alternatives.<br>Output: Sensitivity analysis result. | The sensitivity analysis is performed for multiple candidate designs of the technical system, in order to find out whether a current design corresponds to sensitivity distribution. Optimal case is that the current design mitigates failure events corresponding to the most significant failure events/component in the candidate designs. For example, the most critical events/component of the candidate designs can be redundantly provided in the selected design, to reduce the failure rate of the system to an acceptable level. Certain selection criteria may be used to determine the best solution, such as feasibility, cost factor, etc. Through this interaction, a confirmation whether the current design provides an optimized solution to mitigate a risk stemming from most significant event can be determined.<br>Note that this scenario would correspond to an inverted sequence of blocks 3010 and 3005 according to FIG. 2. |
| III | Input: sensitivity analysis results of single fault tree,<br>Output: result of trade-off analysis. | The most significant failure events and best solution will be used as input to the trade-off analysis. The trade-off analysis result will be the optimal combination of the significant events and best solution. This means that whether the most significant failure events/component were chosen as the improvement object of the best solution will be checked; if this is the case, the result will be this optimal combination; if not, the most significant event/component will be used to construct a new design, e.g., implementing redundant structures or additional monitoring. The fault tree has to be set up accordingly, i.e., not only the structure of the fault tree will change, the failure rate of this significant event/component will also change.<br>The extent of changing the failure rate may depend on the overall failure rate of the fault tree. The goal is to reach the target failure rate with most efficient changes of events/component and with lowest cost. |

TABLE 6-continued

Various options for the interaction between the
sensitivity analysis and the trade-off analysis.

| Variant | Input/Output | Explanation |
|---|---|---|
| IV | Input: result of trade-off analysis<br>Output: sensitivity analysis result | The best alternative will form the final fault tree, i.e., a selected design of the technical system. The sensitivity analysis of this final fault tree may indicate whether the most significant event has been chosen to improve the actual failure rates. If this is the case, a confirmation of the selected design is given; if not, the technical system and along with it fault tree will be reconstructed according to the event with the highest sensitivity, cf. example I. After the most significant failure event, with highest rank, total target fulfillments, and lowest cost, has been determined, this will be chosen as the essential part of solution of the best design. |

The following steps of trade-off analysis could be performed in case that the result of trade-off analysis is unknown. Evaluation values according to the trade-off evaluation criteria will be assigned based on the expert opinion and importance of the individual non-functional specifications for the technical system, i.e., one or more abort criteria could be defined that result in selection of a given design from re-evaluated design, cf. TAB. 4. It is possible to combine the sensitivity analysis criteria and trade-off analysis criteria. For example, in order to identify the most significant failure event of the unfulfilled target failure rate, the highest-ranked, unfulfilled, regardless cost, will be used as searching criteria. Before this step, the unfulfilled alternative based on the trade-off criteria will also be used. Based on the trade-off analysis, the highest ranked failure event can be found and then it is possible to facilitate a further design of the technical system with respect to the component associated with the highest ranked failure event. In the end the two results of trade-off analysis will be compared. Based on the aforementioned comparison, the acceptance of the alternative could be determined, and the most significant event and associated component is also identified. A confirmation of whether the current solution is the most effective (influence on the overall failure rate and cost) will be derived as a result. Next, a concrete example will be described with respect to FIGS. 4, 5, and 6.

Figure 4:
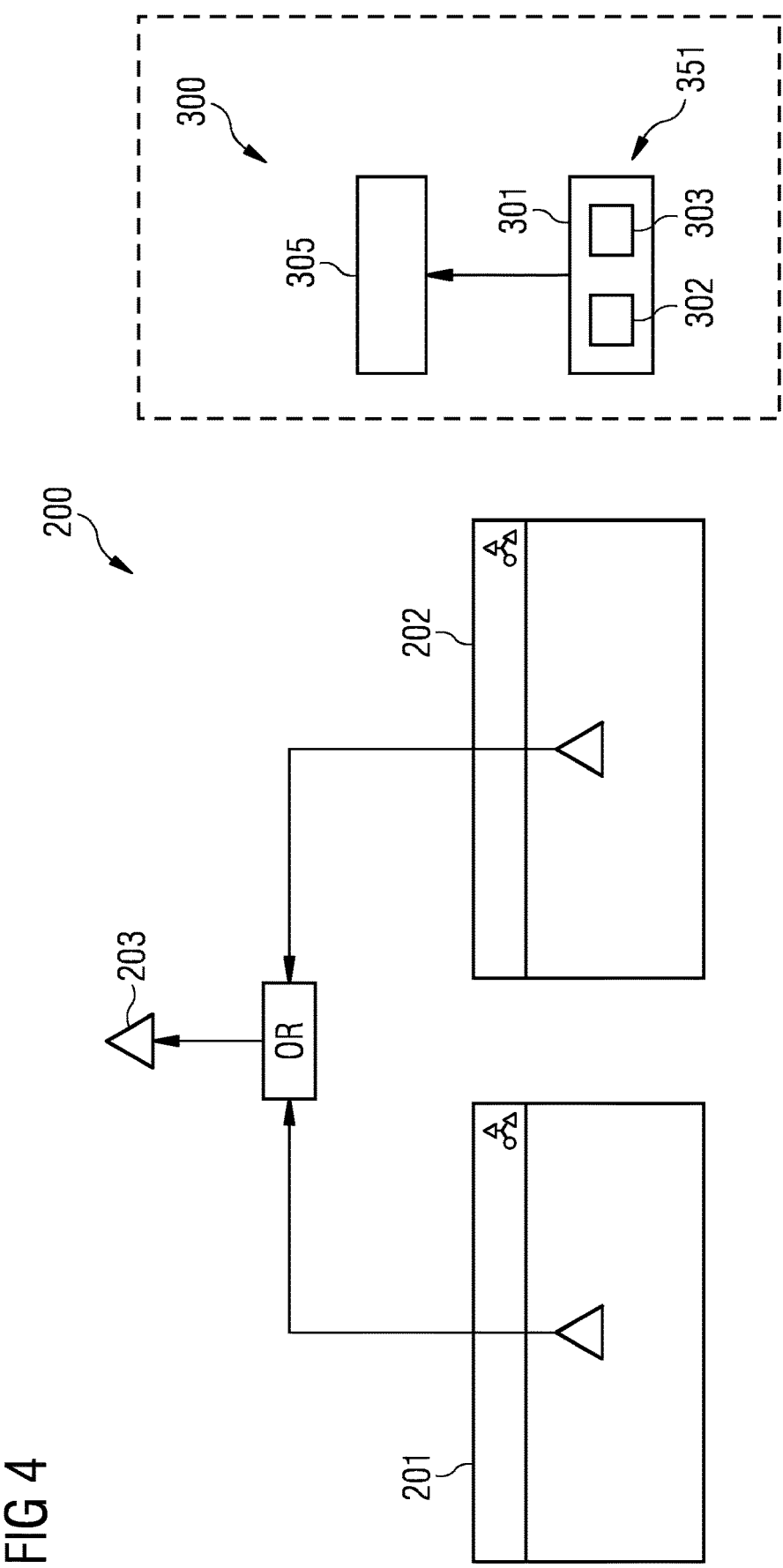
FIG. 4 illustrates a technical system and an associated fault tree according to an initial design according to various examples.

FIG. 4 schematically illustrates a fault tree 200 including two failure events 201 and 202. The fault tree 200 is associated with the technical system 300 illustrated in the inset of FIG. 4. The technical system 300 includes a component 301—e.g., a brake—that in turn includes the components 302 and 303. The component 302 implements a power supply for the brake 301 and the component 303 implements a brake warning contact for the brake 301. The component 301 is associated with the failure event 201 and the component 303 is associated with the failure events 202. In FIG. 4, the setup of the component 301 is according to a design 351 of the technical system 300. The brake 301 provides braking functionality to, e.g., a passenger car 305 of a train.

Thus, there are two failure events 201, 202 associated with the brake, i.e., power supply failure and brake warning contact fails. Both failure events result in a top-level failure event 203 "electric brake fails".

The most significant events are "Brake warning contact.cft.brake warning contact cable broken" and "Brake warning contact.cft.brake warning contact sensor defect".

In the initial design 351 of FIG. 4, the failure rate of the function "brake warning contact" is 5 Failures In Time (FIT; e.g., Number of failures per $10^9$ hours). In the example system, let the failure rate for power supply defect be 10 FIT, and the defect of power supply or brake warning contact leads to the failure of electric brake.

Based on the aforementioned faults trees and failure rates, and with the assumption of a Mean Down Time of 24 hours, Reliability (MTBF), Availability (A), Maintainability (MDT) and Safety (Failure rate) results are calculated. Such results will be used at the end of this section to compare the value of the respective dependability properties. The results of the sensitivity analysis

TABLE 6 sensitivity analysis result of fault tree for design 351

| | | |
|---|---|---|
| 1 | Brake warning contact.cft.brake warning contact cable broken | 0.5 |
| 2 | Brake warning contact.cft.brake warning contact sensor defect | 0.5 |
| 3 | Power supply.cft.Power supply 1 defect | 2.4E−7 |
| 4 | Power supply.cft.Power supply 2 defect | 2.4E−7 |
| | Total | 1.00000048 |

Based on such FTA, it is then possible to determine characteristics that can be used to determine a partial quality score for, e.g., reliability. This is illustrated in TAB. 7.

TABLE 7

Characteristics of FTA that can be used to determine a partial
quality score, e.g., for availability and/or reliability and/or
maintainability. This is for the design 351 of FIG. 4.

| | |
|---|---|
| Availability | 99.99998% |
| Unavailability | 2.40E−5% |
| MTBF | 1.0E8 h |

TABLE 7-continued

Characteristics of FTA that can be used to determine a partial quality score, e.g., for availability and/or reliability and/or maintainability. This is for the design 351 of FIG. 4.

| | |
|---|---|
| Failure Rate Lambda | 1.0E−8 1/h |
| FIT | 10.0 |
| MDT | 24.00 h |
| Mission Time T | 8760.0 h |

Then, the initial design 351 can be modified. i.e., the technical system 300 can be changed with respect to the components 302, 303.

A first further design 352—i.e., including changes of the technical system 300 vis-á-vis the initial design 351—of the fault tree associated with the respective component is illustrated in FIG. 5. According to the design 352, there are two power supplies 302-1, 302-2. The power supply functionality fails if both power supplies 302-1, 302-2 fail (cf. TAB. 2, example II). "Brake warning contact" fails if the brake warning contact cable is broken or if the brake warning contact sensor is defective. They both have the dangerous undetected failure rate of 5 FIT.

In another further design 353, the component "brake warning contact" is replicated and attached onto the current fault tree—this is the design 353 in FIG. 6. This corresponds to a duplication of the respective brake warning contact in the technical system (cf. TAB. 3: example II). This solution leads to the further design 353 of the technical system including a redundant warning contact. A respective fault tree 210 is illustrated in FIG. 6. Here, two failure events 202-1 and 202-2 are present for the two brake warning contacts.

Based on the sensitivity analysis, one finds: The sensitivity value for the failure event associated with the "brake warning contact" is larger than the sensitivity value of the failure event "power supply failure". Thus, according to various examples, the change of the technical system to arrive at the design 353 is favored over the change of the technical system 300 to arrive at the design 352.

With this measure, the most significant component "brake warning contact" according to the sensitivity analysis result has been cloned/duplicated and attached onto the OR-gate of the component fault tree. Because of the redundancy, an AND-gate is added into the component fault tree. This AND-gate is connected with the OR-gate. This yields fault tree 210 of FIG. 6 where the brake warning contact is duplicated. For this further design 353 of the technical system, the partial quality scores are listed in TAB. 8 below:

TABLE 8

Characteristics of FTA that can be used to determine a partial quality score, e.g., for availability and/or reliability and/or maintainability. This is for the design 353 of FIG. 6.

| | |
|---|---|
| Availability | 99.99999999999% |
| Unavailability | 1.15E−11% |
| MTBF | 1.04E14 h |
| Failure Rate Lambda | 1.0E−14 1/h |
| FIT | 1.0E−5 |
| MDT | 12.00 h |
| Mission Time T | 8760.0 h |

After integrating the redundant (not repeated event) component, the sensitivities of the events will be calculated again. The improved availability of the system is 99.99999999999%. Compared with the original availability of 99.99998%, the improvement of availability is around 106.

If the components associated with failure events with lower sensitivity values are duplicated, instead of those components associated with failure events with higher sensitivities—i.e., in the illustrated scenario the power supply is duplicated, cf. FIG. 5, design 352 and fault tree 220—one can compare the change on the availability and other properties.

TABLE 9

Characteristics of FTA that can be used to determine a partial quality score, e.g., for availability and/or reliability and/or maintainability. This is for the design 352 of FIG. 5.

| | |
|---|---|
| Availability | 99.99998% |
| Unavailability | 2.40E−5% |
| MTBF | 1.0E8 h |
| Failure Rate Lambda | 1.0E−8 1/h |
| FIT | 10.0 |
| MDT | 24.00 h |
| Mission Time T | 8760.0 h |

From a comparison of TAB. 7 and TAB. 9 one finds: The availability after duplicating the power supply has no change compared with original fault tree. This is because the design 352 of FIG. 5 does not correspond to a change of the technical system 300 with respect to the component having the largest sensitivity value.

In the following section, the partial quality scores will be calculated based on such alternatives regarding sensitivity analysis and its optimization solutions. The partial quality scores can be determined based on the characteristics of TABs. 7, 8, and 9.

TABLE 10

Partial quality scores of a plurality of non-functional specifications

| Partial quality scores for the following non-functional specification | Initial design according to FIG. 4 | Further design according to FIG. 5 | Further design according to FIG. 6 |
|---|---|---|---|
| Reliability | 8 | 10 | 8 |
| Availability | 0.8 | 1 | 0.8 |
| Maintainability | 0.1 | 0.1 | 0.1 |
| Security | 0.01 | 0.01 | 0.01 |

For example, based on a weighted combination of the partial quality scores according to TAB. 9, it would be possible to determine a joint quality score. It would then be possible to compare the joint quality score with a reference to determine whether or not this criterion is met. For instance, it could be decided that the further design 353 according to FIG. 6 offers the highest joint quality score which fulfils a certain predefined criterion.

Summarizing, above techniques have been described that comprise a sensitivity analysis with a trade-off analysis to determine a sensitivity value for one or more components of a technical system. Thereby, it is possible to close the gap between quantitative sensitivity analysis and quantitative trade-off analysis.

The advantage is that the results of the sensitivity analysis will be used for effective trade-off analysis. This helps finding out the most significant failure events/components for optimizing the current technical system to reach the dependability goals. At the same time, the results of the trade-off analysis offer additional information by use of results of sensitivity analysis. For decision making based on sensitivity analysis, not only the most significant failure events/components are important, but also the results of the trade-off analysis are helpful. This process may improve the effectiveness of both the trade-off analysis and the sensitivity analysis.

Based on the quantitative sensitivity analysis and quantitative trade-off analysis, it is possible to identify events/components to be optimized in order to fulfill the dependability goals.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method, comprising:
    determining, for a plurality of components of a technical system configured in accordance with at least one initial design, importance values, the importance values being indicative of a dependency of at least one non-functional specification of a plurality of non-functional specifications of the technical system configured in accordance with the at least one initial design on a change of the technical system with respect to the components of the plurality of components;
    determining a further design of the technical system based on the at least one initial design, the importance values, and a predefined function describing a joint quality score of the plurality of non-functional specifications for the technical system being configured in accordance with a respective design of the technical system; and
    rolling out production of the technical system using the further design in response to determining that the joint quality score fulfills a predefined criteria.

2. The computer-implemented method of claim 1,
    wherein the importance values comprise sensitivity values determined for failure events of the plurality of components of the technical system,
    wherein the sensitivity values are indicative of a sensitivity of the at least one non-functional specification of the plurality of non-functional specifications of the technical system configured in accordance with the at least one initial design on the multiple failure events.

3. The computer-implemented method of claim 2,
    wherein the sensitivity values are determined based on a partial derivative of the predefined function with respect to the multiple failure events.

4. The computer-implemented method of claim 1,
    wherein the determining of the further design of the technical system comprises:
    determining a plurality of candidate designs for the technical system by modifying one or more components of the plurality of components of the technical system configured according to the at least one initial design, the one or more components being selected from the plurality of components of the technical system based on the importance values of the plurality of components of the technical system configured in accordance with the at least one initial design,
    based on the predefined function, determining the joint quality scores for the technical system being configured in accordance with each one of the plurality of candidate designs; and
    selecting the further design from the plurality of candidate designs based on a comparison of the joint quality scores of each one of the plurality of candidate designs.

5. The computer-implemented method of claim 1, further comprising:
    ranking the importance values of the plurality of components of the technical system configured in accordance with the at least one initial design; and
    selecting one or more components for modification to obtain the further design based on the ranking.

6. The computer-implemented method of claim 1,
    wherein the determining of the importance values and the determining of the further design are repetitively executed in multiple iterations,
    wherein the at least one initial design of a subsequent iteration of the multiple iterations comprises the further design of the technical system of a preceding iteration of the multiple iterations.

7. The computer-implemented method of claim 6, further comprising:
    aborting the executing of the multiple iterations upon the joint quality score of the technical system being configured in accordance with the further design of the respective iteration fulfilling an abort criterion.

8. The computer-implemented method of claim 1,
    wherein the plurality of non-functional specifications are selected from the group comprising: reliability, availability, maintainability, safety, security, cost, and resources.

9. The computer-implemented method of claim 1,
    wherein the importance values comprise sensitivity values which are determined based on a fault tree.

10. The computer-implemented method of claim 9,
    wherein the determining of the further design of the technical system comprises:
    selecting a given failure event from the multiple failure events based on the importance values; and
    re-configuring a respective component of the plurality of components of the technical system associated with the given failure event, to obtain the further design.

11. The computer-implemented method of claim 1,
    wherein the determining of the further design of the technical system comprises:
    selecting a given component of the plurality of components based on the importance values and duplicating and/or changing the selected component of the plurality of components of the technical system.

12. The computer-implemented method of claim 1, wherein the predefined function comprises, for one or more of the plurality of non-functional specifications, a non-linear activation function of a respective dependency of the joint quality score on the respective design of the technical system.

13. The computer-implemented method of claim 1, wherein the joint quality score is determined based on a weighted combination of partial quality scores associated with each one of the plurality of non-functional specifications.

14. A device comprising:
a control circuitry configured to:
  determine, for a plurality of components of a technical system configured in accordance with at least one initial design, importance values, the importance values being indicative of a dependency of at least one non-functional specification of a plurality of non-functional specifications of the technical system configured in accordance with the at least one initial design on a change of the technical system with respect to the components of the plurality of components;
  determine a further design of the technical system based on the at least one initial design, the importance values, and a predefined function describing a joint quality score of the plurality of non-functional specifications for the technical system being configured in accordance with a respective design of the technical system; and
  roll out production of the technical system using the further design in response to determining that the joint quality score fulfills a predefined criteria.

\* \* \* \* \*